(12) United States Patent
Pnueli et al.

(10) Patent No.: US 8,594,384 B2
(45) Date of Patent: Nov. 26, 2013

(54) METHOD AND SYSTEM FOR MEASURING TEXT-RENDERING QUALITY

(75) Inventors: Ayelet Pnueli, Haifa (IL); Renato Keshet, Haifa (IL); Avi Schori, Kochav Yair (IL); Gitit Ruckenstein, Haifa (IL); Yaron Ruckenstein, legal representative, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 498 days.

(21) Appl. No.: 12/744,912

(22) PCT Filed: Nov. 30, 2007

(86) PCT No.: PCT/US2007/024624
§ 371 (c)(1),
(2), (4) Date: May 26, 2010

(87) PCT Pub. No.: WO2009/070142
PCT Pub. Date: Jun. 4, 2009

(65) Prior Publication Data
US 2010/0303306 A1  Dec. 2, 2010

(51) Int. Cl.
*G06K 9/00* (2006.01)
(52) U.S. Cl.
USPC .......................................................... 382/112
(58) Field of Classification Search
None
See application file for complete search history.

(56) References Cited

U.S. PATENT DOCUMENTS

| | | | | |
|---|---|---|---|---|
| 5,235,652 A | * | 8/1993 | Nally | 382/112 |
| 5,712,921 A | * | 1/1998 | Zabele | 382/112 |
| 7,171,046 B2 | * | 1/2007 | Myers et al. | 382/187 |
| 7,480,409 B2 | * | 1/2009 | Jun et al. | 382/176 |
| 7,576,730 B2 | * | 8/2009 | Anwar | 345/173 |
| 7,953,295 B2 | * | 5/2011 | Vincent et al. | 382/299 |
| 8,249,344 B2 | * | 8/2012 | Viola et al. | 382/173 |
| 8,306,356 B1 | * | 11/2012 | Bever et al. | 382/275 |

(Continued)

FOREIGN PATENT DOCUMENTS

| | | |
|---|---|---|
| WO | WO-89/07804 | 8/1989 |
| WO | 01/54064 | 7/2001 |
| WO | 03/023488 | 3/2003 |

OTHER PUBLICATIONS

Baldi P et al "Bioinformatics: The Machine Learning Approach, Machine Learning" In: "Bioinformatics: The Machine Learning Approach,", Aug. 1, 2001, Cambridge MA XP055052980, ISBN: 978-0-26-202442-6.

(Continued)

*Primary Examiner* — Nancy Bitar

(57) ABSTRACT

Method embodiments of the present invention provide for semi-automated or fully automated assessment of the quality of device-rendered text, including graphical symbols, characters, and other printable or displayable patterns. Method embodiments of the present invention employ one or more metrics that involve the comparison of input characters, including text characters, symbols, and character-like graphics, with corresponding digital output characters obtained by capturing images of characters rendered by a character-rendering device. The one or more metrics include individual computed relative entropy $APQ_i$ metrics, reflective of differences in character-to-character distance distributions between one input character c, and the set of input characters c*, a cumulative computed relative entropy APQ, stroke irregularity, contrast measure, sharpness, and background uniformity. These individual metrics can be computed and stored separately as well as output to a user of a character-rendering-quality measurement system, or may be combined together in various ways to produce one or more comprehensive, cumulative metrics for storage and output.

14 Claims, 20 Drawing Sheets

(56) References Cited

U.S. PATENT DOCUMENTS

2004/0194014 A1* 9/2004 Anwar .................. 715/500
2005/0100219 A1* 5/2005 Berkner et al. ............ 382/190
2005/0259866 A1* 11/2005 Jacobs et al. ............. 382/157

2006/0056697 A1 3/2006 Jun et al.

OTHER PUBLICATIONS

Extended European Search Report dated Feb. 19, 2013; Application No. 07867588.1 Filed Nov. 30, 2007.

* cited by examiner 304  302

320 — ▨ in output character only 26 (*IO*)

322 — ▧ in input character only 23 (*OO*)

324 — ▩ in both input character and output character 327 (*B*)

Total = 376 (*T*)

|   | 1 | 2 | 3 | 4 | 5 |
|---|---|---|---|---|---|
| 1 | 0<br>0 | 4.7<br>4.7 | 3.2<br>3.2 | 2.2<br>2.2 | 1.13<br>1.13 |
| 2 | 4.7<br>4.7 | 0<br>0 | 4.7<br>4.7 | 2.9<br>2.9 | 4.6<br>4.6 |
| 3 | 3.2<br>3.2 | 4.7<br>4.7 | 0<br>0 | 3.4<br>3.4 | 2.9<br>2.9 |
| 4 | 2.2<br>2.2 | 2.9<br>2.9 | 3.4<br>3.4 | 0<br>0 | 4.3<br>4.3 |
| 5 | 1.13<br>1.13 | 4.6<br>4.6 | 2.9<br>2.9 | 4.3<br>4.0 | 0<br>0 |

$$d_{ik} = \frac{(IO^2 + OO^2)}{T}$$

Figure 8B

|   | 1 | 2 | 3 | 4 | 5 |
|---|---|---|---|---|---|
| 1 | 1<br>1 | .0091<br>.0091 | .041<br>.041 | .11<br>.11 | .32<br>.32 |
| 2 | .0091<br>.0091 | 1<br>1 | .0091<br>.0091 | .056<br>.056 | .01<br>.01 |
| 3 | .041<br>.041 | .0091<br>.0091 | 1<br>1 | .033<br>.033 | .056<br>.056 |
| 4 | .11<br>.11 | .056<br>.056 | .033<br>.033 | 1<br>1 | .014<br>.014 |
| 5 | .32<br>.32 | .01<br>.01 | .056<br>.056 | .014<br>.014 | 1<br>1 |

$P_{ik} = e^{-d(\text{input}_i, \text{input}_k)}$ $Q_{ik} = e^{-d(\text{output}_i, \text{input}_k)}$ $\Delta PQ_1 = 0+0+0+0+0 = 0$ $\Delta PQ_2 = 0+0+0+0+0 = 0$ $\Delta PQ_3 = 0+0+0+0+0 = 0$ $\Delta PQ_4 = 0+0+0+0+0 = 0$ $\Delta PQ_5 = 0+0+0+0+0 = 0$ $\Delta PQ = 0$

Figure 8C

|   | 1 | 2 | 3 | 4 | 5 |
|---|---|---|---|---|---|
| 1 | 0<br>.33 | 4.7<br>3.4 | 3.2<br>3.6 | 2.2<br>2.2 | 1.13<br>1.9 |
| 2 | 4.7<br>5.4 | 0<br>.13 | 4.7<br>4.1 | 2.9<br>2.8 | 4.6<br>5.4 |
| 3 | 3.2<br>3.1 | 4.7<br>4.5 | 0<br>.2 | 3.4<br>3.2 | 2.9<br>2.9 |
| 4 | 2.2<br>1.3 | 2.9<br>2.9 | 3.4<br>4.7 | 0<br>.3 | 4.3<br>2.3 |
| 5 | 1.13<br>1.3 | 4.6<br>4.2 | 2.9<br>3.4 | 4.3<br>1.8 | 0<br>.6 |

$$d_{ik} = \frac{(IO^2 + OO^2)}{T}$$

Figure 9B

|   | 1 | 2 | 3 | 4 | 5 |
|---|---|---|---|---|---|
| 1 | 1<br>.72 | .0091<br>.033 | .041<br>.027 | .11<br>.11 | .32<br>.15 |
| 2 | .0091<br>.005 | 1<br>.88 | .0091<br>.017 | .056<br>.061 | .01<br>.005 |
| 3 | .041<br>.045 | .0091<br>.011 | 1<br>.82 | .033<br>.041 | .056<br>.056 |
| 4 | .11<br>.27 | .056<br>.056 | .033<br>.0091 | 1<br>.74 | .014<br>.10 |
| 5 | .32<br>.27 | .01<br>.015 | .056<br>.033 | .014<br>.17 | 1<br>.55 |

$$P_{ik} = e^{-d(\text{input}_i, \text{input}_k)}$$
$$Q_{ik} = e^{-d(\text{output}_i, \text{input}_k)}$$

$\Delta PQ_1 = .4379 - .0169 + .0247 + 0 + .3498 = .4817$
$\Delta PQ_2 = .0078 + .1844 - .0082 - .00207 + .01 = .1920$
$\Delta PQ_3 = -.00551 - .00249 + .2863 - .00103 + 0 = .2680$
$\Delta PQ_4 = -.143 + 0 + .0613 + .4344 - .0397 = .3135$
$\Delta PQ_5 = -.0784 - .00585 + .0427 - .0504 + .86 = .9270$ $\Delta PQ = 0.4364$

Figure 9C

METHOD AND SYSTEM FOR MEASURING TEXT-RENDERING QUALITY

TECHNICAL FIELD

The present invention is related to assessing the quality of text rendered by character-rendering devices and, in particular, to methods that can be incorporated into partially or fully automated systems for measuring the quality of text output by text-rendering devices.

BACKGROUND OF THE INVENTION

Designers and manufacturers of printing devices need to be able to evaluate the quality of text and graphics printed by the printing devices. In the past, designers and manufacturers of printing devices have relied on visual assessment of the quality of printed text and graphics as well as on a number of standard measurements of printed-text quality. However, visual-inspection-based assessment of printing quality may be quite subjective, and, when a large number of printing-quality assessments need to be made, can be tedious, expensive, error prone, and exhibit high variation. Unfortunately, many of the standard metrics currently applied to evaluate the quality of printing do not closely correspond to human assessment of print quality based on visual inspection of printed materials, and may often be quite scale dependent, as well as dependent on the particular text and graphics used for assessing printing quality, background colors and shades on which the text and graphics are printed, and other such parameters and characteristics. For this reason, developers and manufacturers of printing devices and other character-rendering devices, including display devices, as well as vendors, retailers, and, ultimately, users of printing devices and other text-rendering devices may all have need for deterministic, reliable, and automatable character-rendering-quality measurement methods that are relatively independent of scale of the rendered text and graphics, background colors and shades, and other such parameters and characteristics.

SUMMARY OF THE INVENTION

Method embodiments of the present invention provide for semi-automated or fully automated assessment of the quality of device-rendered text, including graphical symbols, characters, and other printable and displayable patterns. Method embodiments of the present invention employ one or more metrics that involve the comparison of input characters, including text characters, symbols, and character-like graphics, with corresponding digital output characters obtained by capturing images of characters rendered by a character-rendering device. The one or more metrics include individual computed relative entropy $\Delta PQ_i$ metrics, reflective of differences in character-to-character distance distributions between one input character $c_i$ and the set of input characters $c_k$, a cumulative computed relative entropy $\Delta PQ$, stroke irregularity, contrast measure, sharpness, and background uniformity. These individual metrics can be computed and stored separately as well as output to a user of a character-rendering-quality measurement system, or may be combined together in various ways to produce one or more comprehensive, cumulative metrics for storage and output.

BRIEF DESCRIPTION OF THE DRAWINGS

FIGS. 8A-C illustrate computation of the distance-distribution-based metric $\Delta PQ$ for a small, exemplary character set.

FIGS. 9A-C use identical illustration conventions as used in FIGS. 8A-C to show computation of the distance-distribution-based metric $\Delta PQ$ for a set of output characters that differ from a set of input characters.

DETAILED DESCRIPTION OF THE INVENTION

Method and system embodiments of the present invention are directed to a determination of rendered-text quality to enable assessment of the quality and/or functional state of character-rendering devices, including various types of electromechanical text-rendering and text-display devices. Method embodiments of the present invention may be semi-automated, with certain steps carried out computationally and other steps carried out manually, or may alternatively be incorporated into a fully automated system. Method embodiments of the present invention produce useful and tangible results that may be stored in various computer-readable media, output to a user, or employed as input to various types of quality-control systems, design systems, and monitoring systems.

Figure 1:
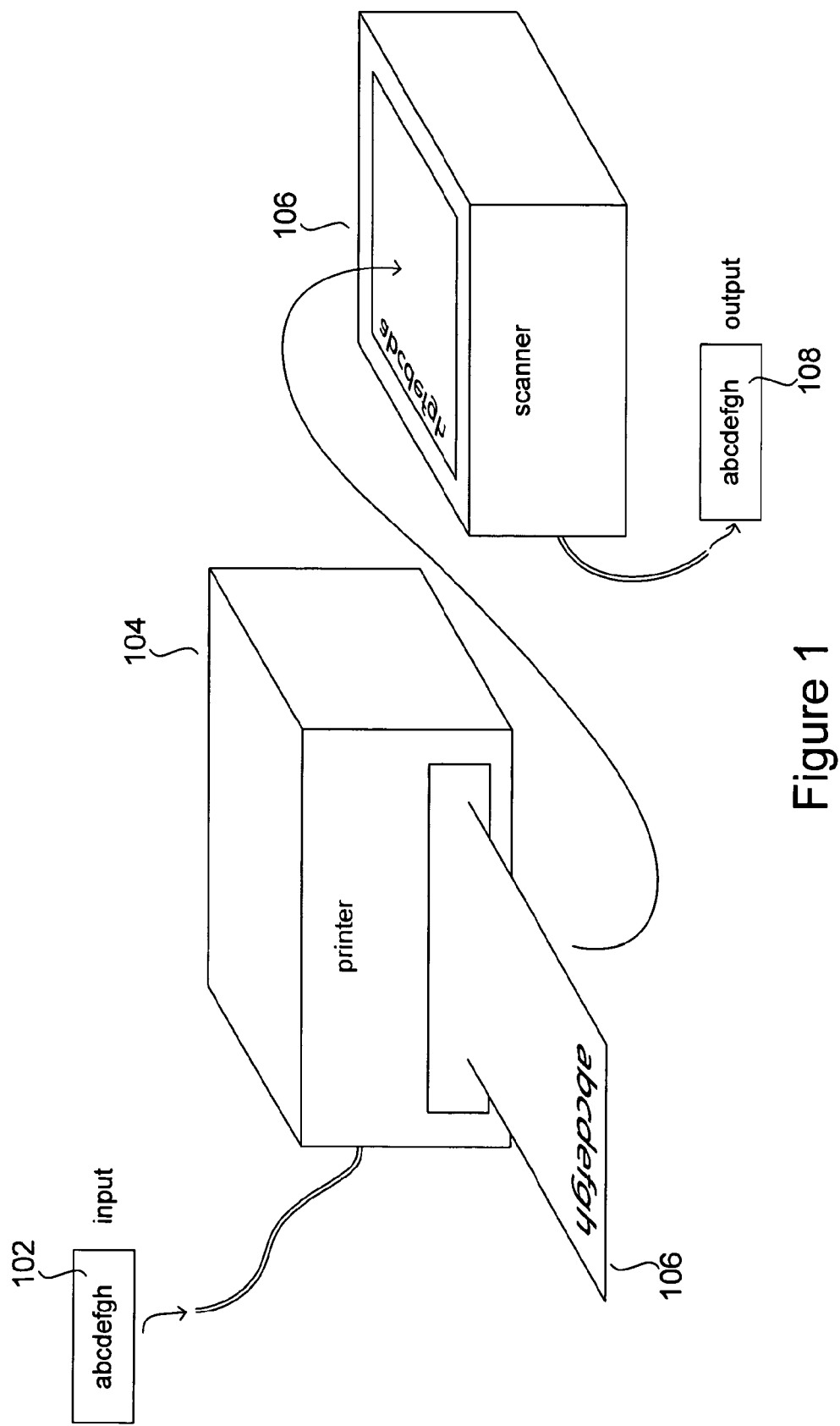
FIGS. 1 and 2 illustrate an overall methodology employed in various method embodiments of the present invention.
Figure 2:
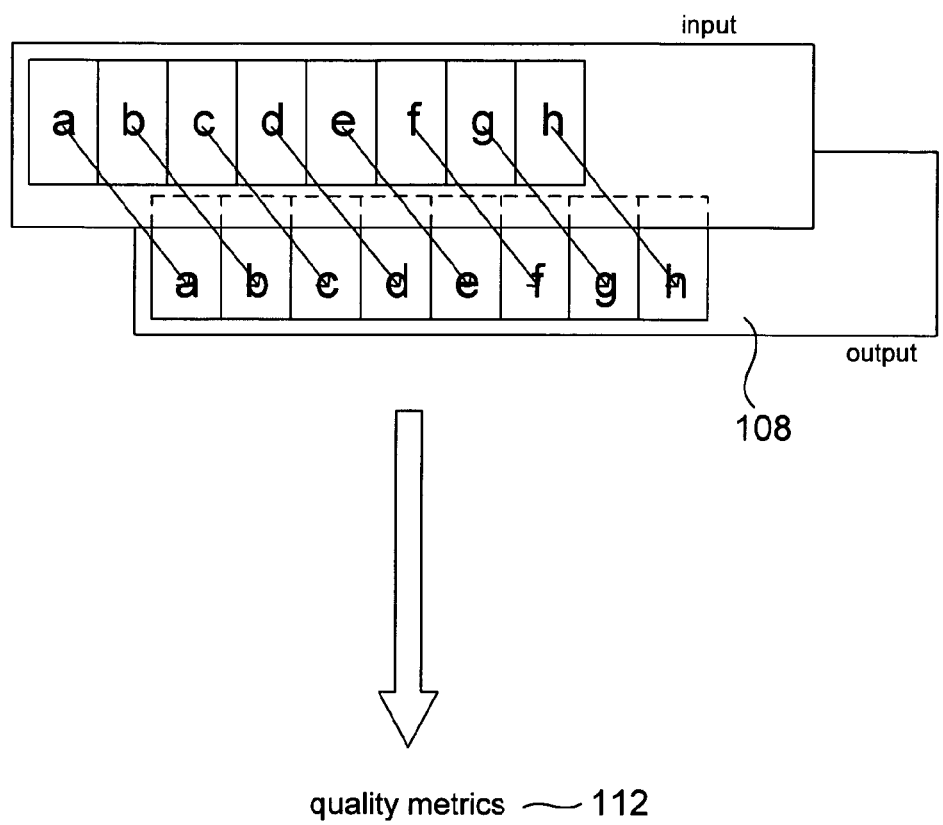

FIGS. 1 and 2 illustrate an overall methodology employed in various method embodiments of the present invention. A test pattern of characters is first devised in order to measure printed-text quality. In FIG. 1, the test pattern 102 is a very short sequence of eight lower-case characters. In a practical system, the test pattern may include many hundreds of different characters, each character or sequence of characters repeated at different sizes and in different positions within the test pattern. The set of test characters is input to a printing device 104 for printing onto a sheet of paper 106 or rendering on some other medium. In alternative embodiments of the present invention, the test characters may be input to other types of character-rendering devices and media, including text-display devices, electronic paper, and other chemical/mechanical/electronic character-rendering devices and media. Printing devices are described, below, as a familiar and important example of character-rendering devices, but are, in no way, intended to limit the scope of the current invention. The test characters are generally converted to digital, pixel-based maps or templates prior to printing. These digital maps or templates can be electronically intercepted to serve as digital input characters. In other words, for the purposes of discussing the present invention, the phrases "input character" and "digital input character" refers to a digital, pixel-based map of a character that is used, internally, by a character-rendering device to render a test-pattern character, either by displaying characters or by imparting character images to a sheet of paper, another such printable medium, a display medium, and other character-image display or receiving devices and/or media. In the currently described embodiment, the printed characters are then scanned, by a scanning device 106, to produce digital output characters 108 corresponding to the input characters. In alternative embodiments, images of rendered characters may be captured by photography or by any of various other ways to capture the images of rendered characters. Next, as shown in FIG. 2, the output characters 108 are computationally aligned and registered with the input characters 110 so that the digital map that constitutes each input character $c_i$ can be matched with a corresponding digital output character map $\hat{c}_i$ to facilitate computation of a variety of different quality metrics. Once the input characters are aligned and registered with the output characters, quality metrics are computed 112 and stored in various types of computer-readable medium and/or output to a user.

Figure 3A:
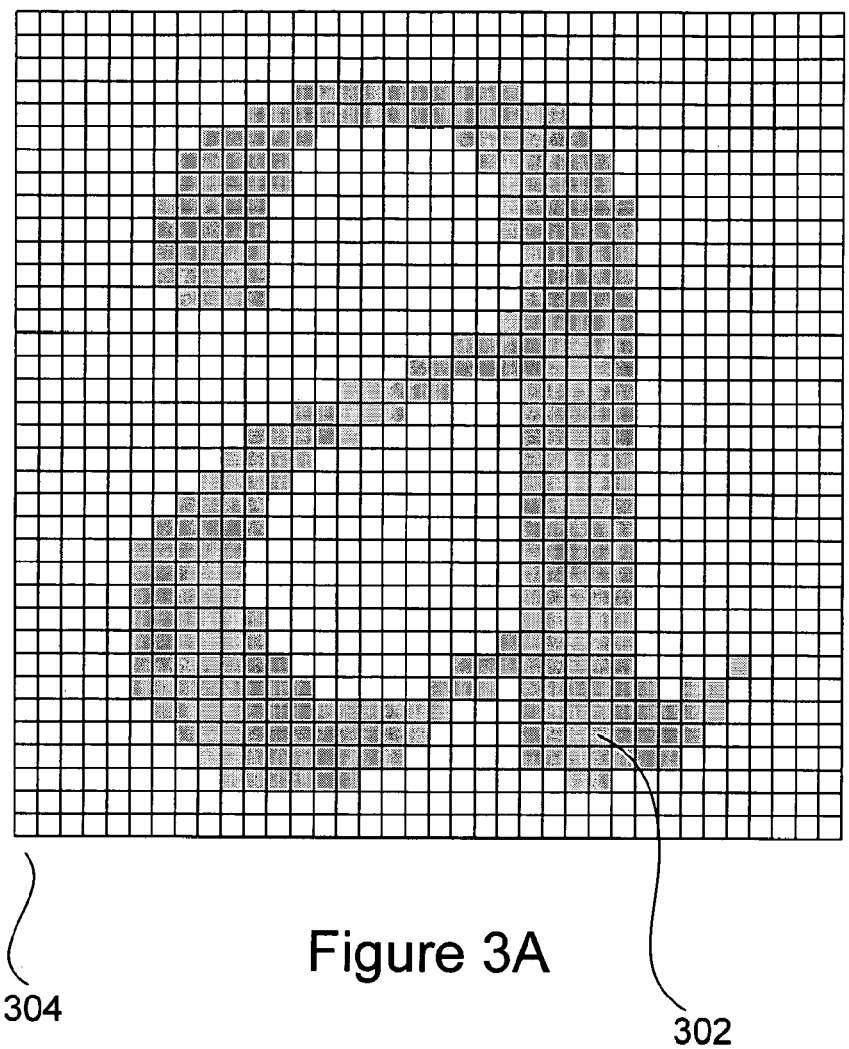
FIGS. 3A-C illustrate an input character, a corresponding output character, and various measurements that may be used to compute a distance metric for the input character/output character pair.
Figure 3B:
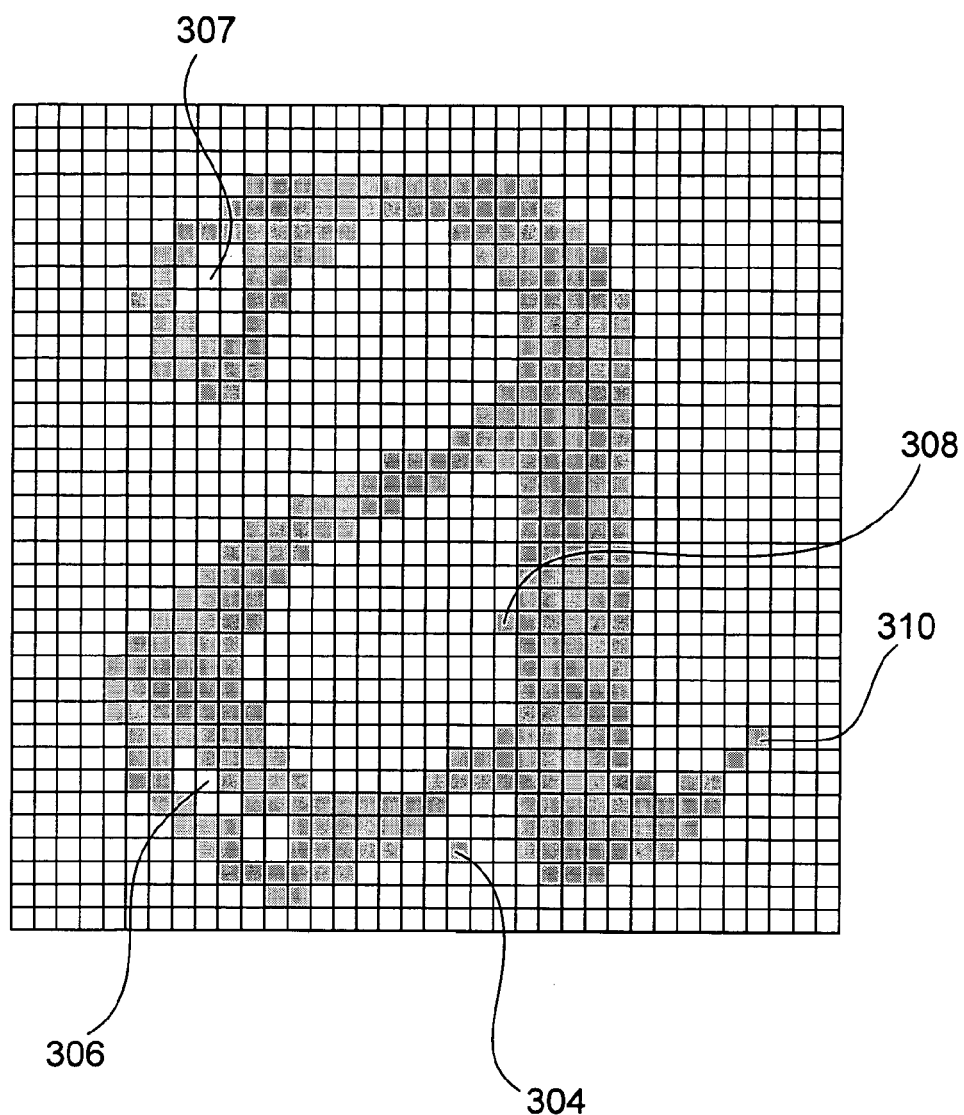
Figure 3C:
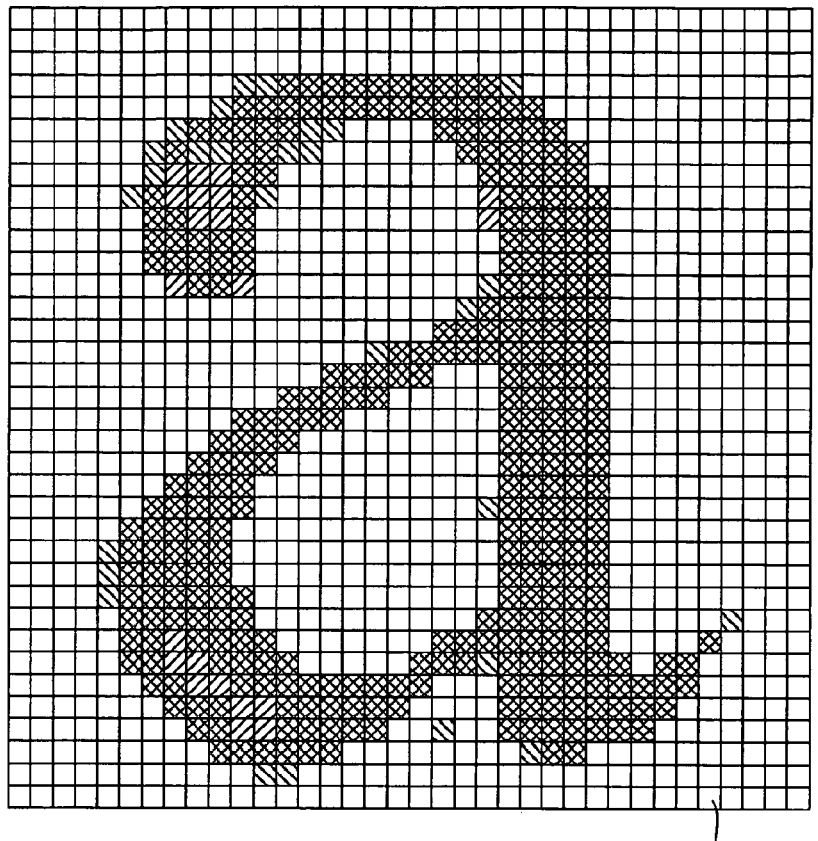

A variety of different primitive metrics are employed in computing the quality metrics that represent embodiments of the present invention. The first primitive metric is a distance metric that measures the distance between, or similarity/dissimilarity of, an input character $c_i$ and corresponding output character $\hat{c}_i$. FIGS. 3A-C illustrate an input character, a corresponding output character, and various measurements that may be used to compute a distance metric for the input character/output character pair. In FIG. 3A, an exemplary input character "a" is shown as a pixel-based template. The input character 302 is a pattern of relatively dark, or low, pixel-intensity values within a rectangular pixel grid 304 that includes relatively light, or high, background pixels. In many cases, the non-character pixels, or background pixels, have higher intensities than the input-character pixels, as is the case for familiar black-character-on-white-background printing or display. In other cases, the input-character pixels may have higher intensities than the background pixels. In general, pixel-intensity values are expressed as integer values selected from a range of grayscale values, often the range [0,255]. However, the methods of the present invention can also be employed to measure the quality of color printing or color rendering, with scanned or otherwise captured digital output characters encoded as three integer values associated with each pixel. Colored-text encodings can be transformed to monochrome encodings in which each pixel is associated with a single integer intensity value. Alternatively, each different color-encoding value associated with a pixel may be separately analyzed, by methods of the present invention, only a single color-related value among the three color-related values associated with pixels may be analyzed, or the color-related values associated with each pixel may be mathematically combined to produce a single, composite value. For the purposes of the present invention, single-valued pixels are assumed, either directly obtained by monochrome scanning or computationally obtained from colored-text encodings.

FIG. 3B shows the digital encoding of an output character responding to the input character shown in FIG. 3A. In this case, the quality of the character-rendering device that rendered the output character appears to be relatively low, with several regions 306-307 in the output character having high intensity values, while corresponding regions of the input character have low intensity values, and with a number of pixels 308-310 in the output character having low intensity values, while corresponding pixels in the input character template have high intensity values. FIG. 3C illustrates a superposition of the input character, shown in FIG. 3A, and the output character shown in FIG. 3B. In FIG. 3C, a downward-slanted crosshatching 320 is used to indicate those pixels with low intensities in the output character, but high intensities in the input character, an upward-sloped crosshatching 322 is used to indicate pixels with low intensities in the input character but high intensities in the output character, and a double-cross hatching 324 that indicates pixels with low intensities both in the input character and the output character. Pixels without crosshatching in FIG. 3C have high intensities both in the output character and in the input character. Again, a low intensity pixel appears to be dark, and a high-intensity pixel appears to be white or light. FIG. 3C shows, in addition to the superposition 316 of the output character and input character, counts of the various types of character pixels. These counts include (1) IO, the number of pixels with low intensities in the output character and high intensities in the input character; (2) OO, the number of pixels with low intensities in the input character and high intensities in the output character; (3) B, the number of pixels with low intensities in both the input character and output character; and (4) T, the total number of pixels with low intensities in either or both of the output character and input character. Armed with these values, any of a variety of different distance metrics can be computed and subsequently used to compute the quality metrics that represent embodiments of the present invention. A distance between two characters reflects the similarity/dissimilarity of the two characters, with a smaller distances corresponding to greater similarity and larger distances corresponding to greater dissimilarity. A few exemplary distance metrics are provided below:

$$d_{(input, output)} = IO + OO$$

$$d_{(input, output)} = \frac{IO^2 + OO^2}{T}$$

$$d_{(input, output)} = \frac{IO + OO}{T}$$

$$d_{(input, output)} = IO^2 + O^2$$

Figure 4:
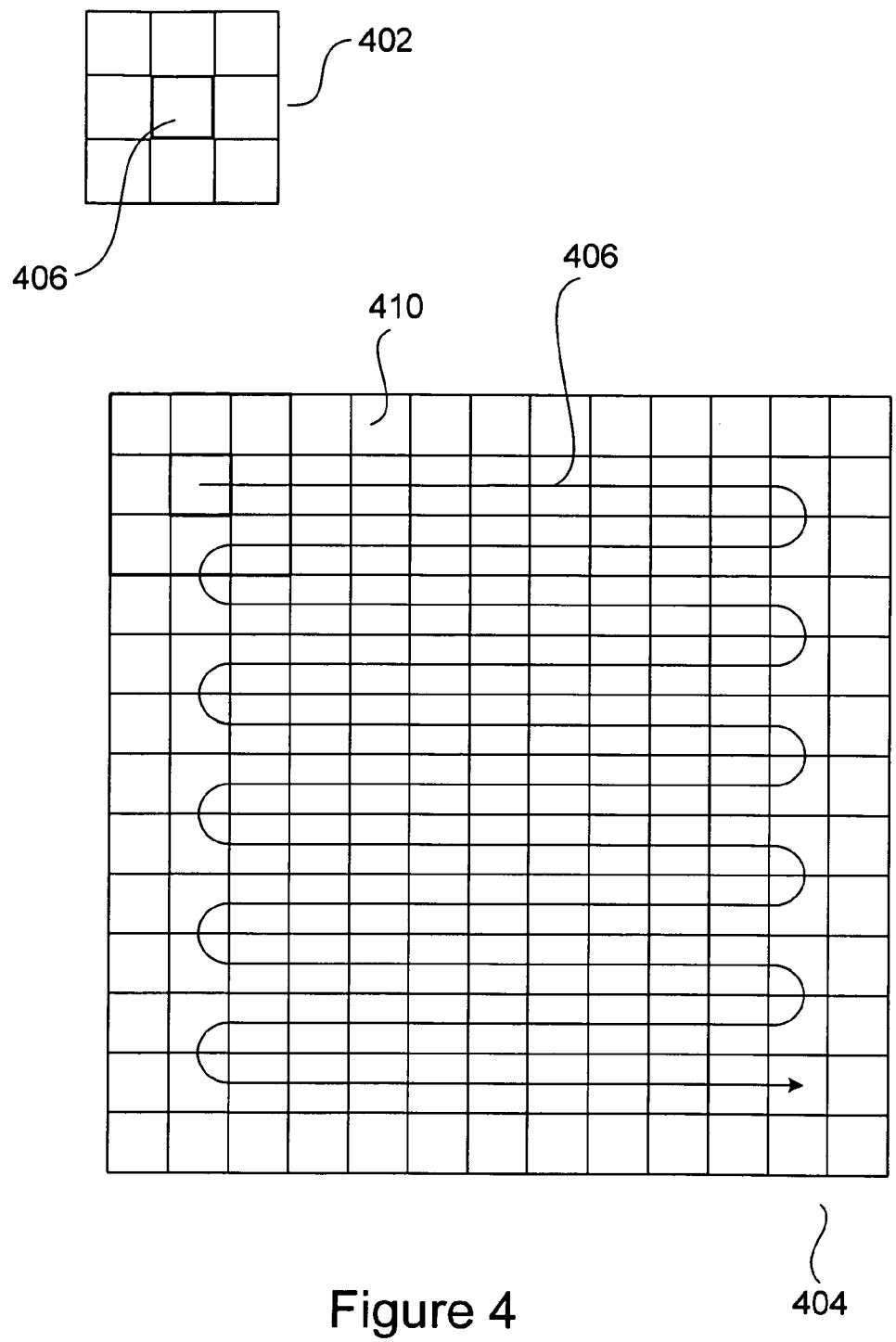
FIG. 4 illustrates a general approach to character dilation and/or character erosion.

Two operations that are employed to compute the quality metrics that represent embodiments of the present invention include character dilation and character erosion. These two operations are similar, and both involve a conceptual application of a kernel, or small neighborhood, to each intensity value within the pixel-based representation of an input character or output character. FIG. 4 illustrates a general approach to character dilation and/or character erosion. As shown in FIG. 4, a kernel 402 is superimposed over each pixel in a pixel-based map 404 of a character. In FIG. 4, the kernel 402 is a 3×3 matrix. The center of the kernel 406 is overlaid on a pixel in the pixel-based character map 404 to compute a replacement value for the pixel value of the pixel in the pixel-based character map that is then entered into a result character map (not shown in FIG. 4). Thus, as shown by the curved line 406 in FIG. 4, the kernel is successively superimposed over each of a series of successive pixel values within the character map in order to generate either a dilated character map or an eroded character map. The kernel cannot be fully superimposed over border pixels, such as pixel 410. In such cases, either a truncated kernel may be used, or, since the border regions generally are high-intensity pixels, they can simply be omitted from the computation of a dilated character map or eroded-character map.

Figure 5A:
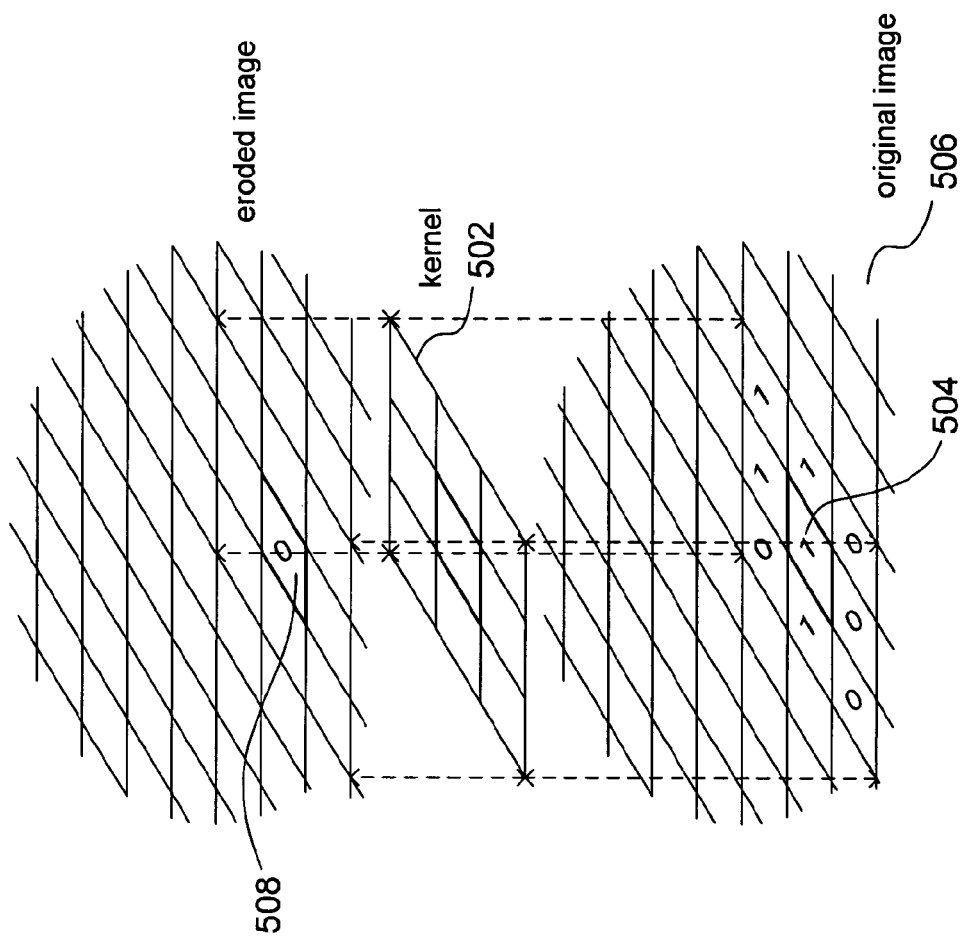
FIGS. 5A-B illustrate erosion and dilation operations, respectively.
Figure 5B:
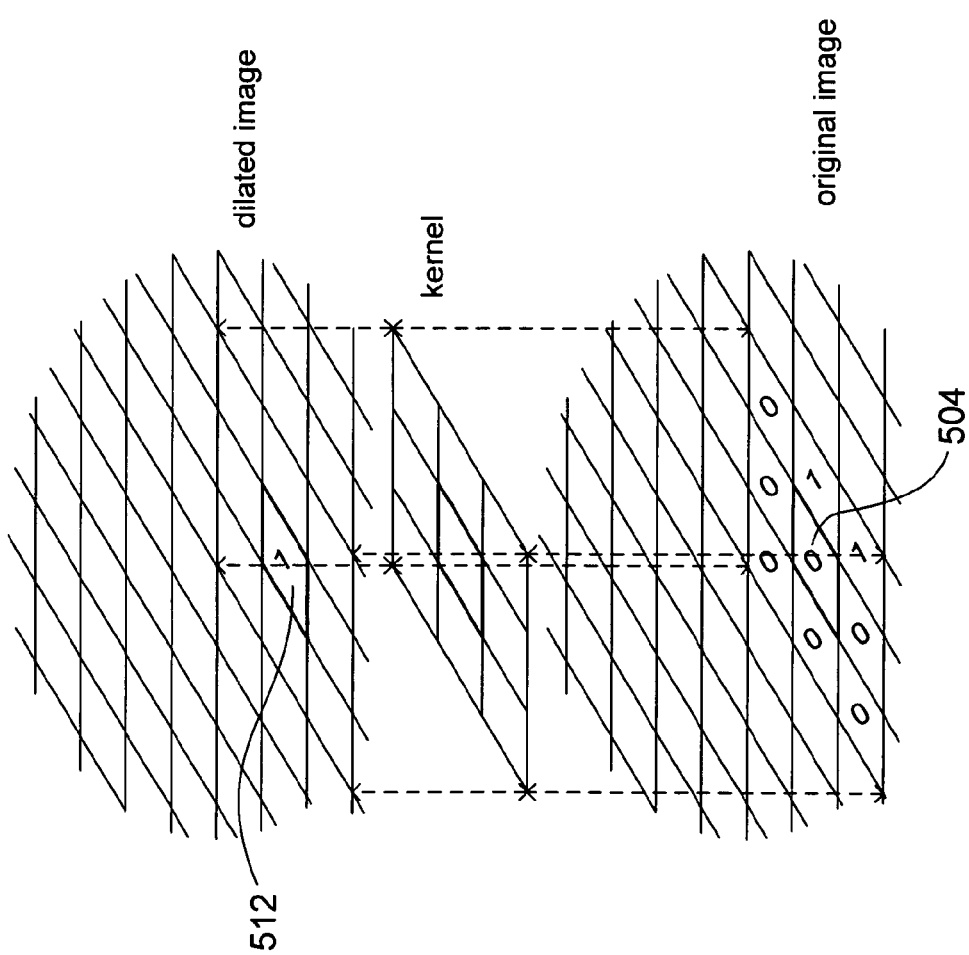
Figure 6A:
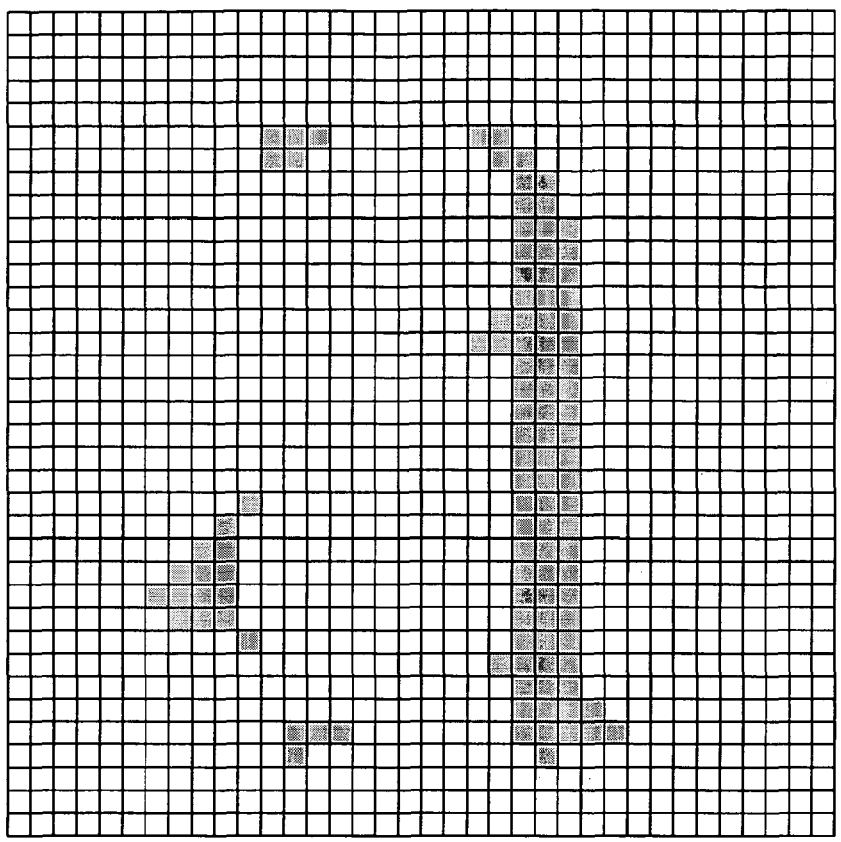
FIGS. 6A-B show an eroded character "a" and a dilated character "a" corresponding to printed character "a" shown in FIG. 3B.
Figure 6B:
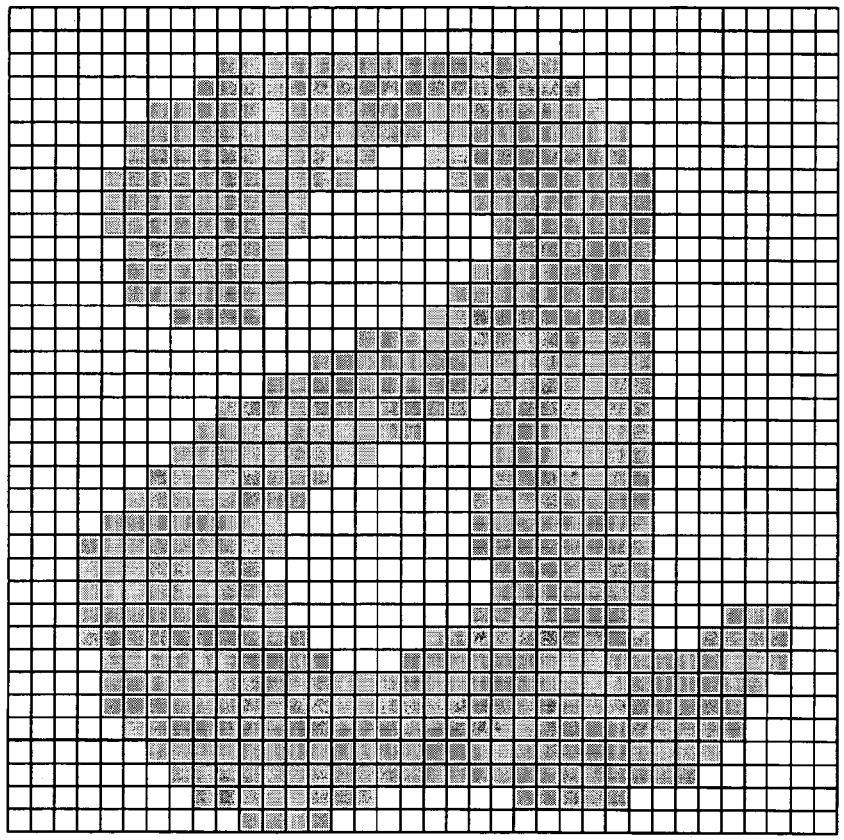

FIGS. 5A-B illustrate erosion and dilation operations, respectively. In FIG. 5A, the kernel 502 is positioned over pixel 504 of the original image 506 to create a neighborhood of pixel values about pixel 504. The pixel-intensity values of the original image within the neighborhood are then considered to determine a pixel value 508 of the eroded-character map corresponding to the considered pixel 504 in the original character map. As one example, for a monochrome, binary map in which pixel values are either "0" or "1," with "0" indicating low intensity and "1" indicating high intensity, when the number of 0-valued neighborhood pixel values is greater than or equal to a threshold value, then the resulting pixel value for the eroded image 508 corresponding to the central pixel 504 of the original character map is set to "0." In certain embodiments, the threshold may be "1," so that if even a single "0" value is observed in the neighborhood of the considered pixel 504, then the corresponding value for that pixel in the eroded character map is "0." Dilation, shown in FIG. 5B, is essentially opposite to erosion. In the case of dilation, when the number of low-intensity pixel values within the superposition neighborhood of the considered pixel 504 of the original character map are equal to, or exceed a threshold value, then the corresponding pixel value 512 is also low. In certain embodiments, in which pixel values are either "0" or "1," when even a single neighborhood pixel in the superposition of the kernel with the original character map has the value "1," then the corresponding value 512 of the currently considered pixel 54 is "1." FIGS. 6A-B show an eroded character "a" and a dilated character "a" corresponding to rendered character "a" shown in FIG. 3B. In this case, the original character map and the eroded and dilated character maps are binary, with "0" indicating background and "1" indicating a character pixel, with the erosion threshold equal to "1," and with the dilation threshold equal to "1." Various alternative types of erosion and dilation may be employed, including use of different thresholds, or multiplication of kernel values with corresponding original-character-map values and summing of the products as a basis for computation of a composite value from which to determine a resultant-character-map value corresponding to a currently considered pixel in an original image.

In order to avoid complexities and non-uniformities in quality-metric computation arising from different background shades and different contrasts in scanned output character maps, the scanned output character maps may be tone mapped as a first step in the methods that represent embodiments of the present invention. Tone mapping essentially maps pixel values within a first range of pixel values to corresponding pixel values in a second range of pixel values. For example, a low-contrast output character map may have intensity values ranging from 100 to 150. Tone mapping can be used to map the low-contrast range to the range [0,255]. Alternatively, binary images, with only the pixel values "0" and "1," are convenient for various image-processing tasks, and an output-character map can be transformed from pixel values in the grayscale range [0,255] to [0,1], with high-intensity pixels above a threshold value represented by "0" and low-intensity pixels below or equal to the threshold represented by "1," in essence inverting the magnitudes as well as truncating the range of values. In many method embodiments of the present invention, output-character maps are initially tone mapped to a particular range of pixel-intensity values to facilitate computation of various intermediate results and, finally, the quality metrics that represent embodiments of the present invention. Pixels are generally characterized as background-intensity pixels and foreground-intensity or character-intensity pixels. In some cases, binary images may be most useful, and, in others, grayscale ranges are most useful.

As a second step, the output-character test pattern needs to be aligned, oriented, and registered with the input-character test pattern. There are a variety of approaches to accomplish this task. In many approaches, the positions and orientations of the output-character test pattern with respect to the input-character test pattern can be varied over ranges of positions, orientations, and scales in order to find an orientation, position, and scale that produce the smallest overall distance between the output-character test pattern and the input-character test pattern. Then, individual output characters corresponding to individual input characters can be located by translation of the input-character map to a region of the output-character test pattern that provides a best correspondence, as measured by distance between the input character and proposed corresponding output character. In certain embodiments, the orientation and/or scale may be computable, based on known character-rendering-device characteristics.

Figure 7A:
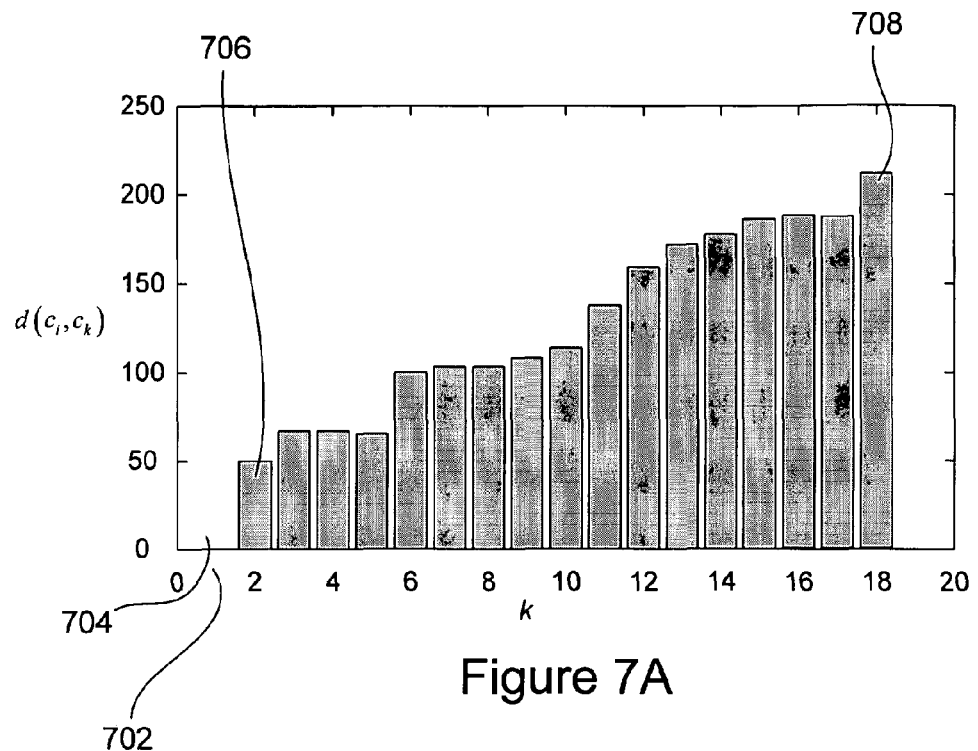
FIGS. 7A-B show two different distance distributions for a particular character $c_i$.
Figure 7B:
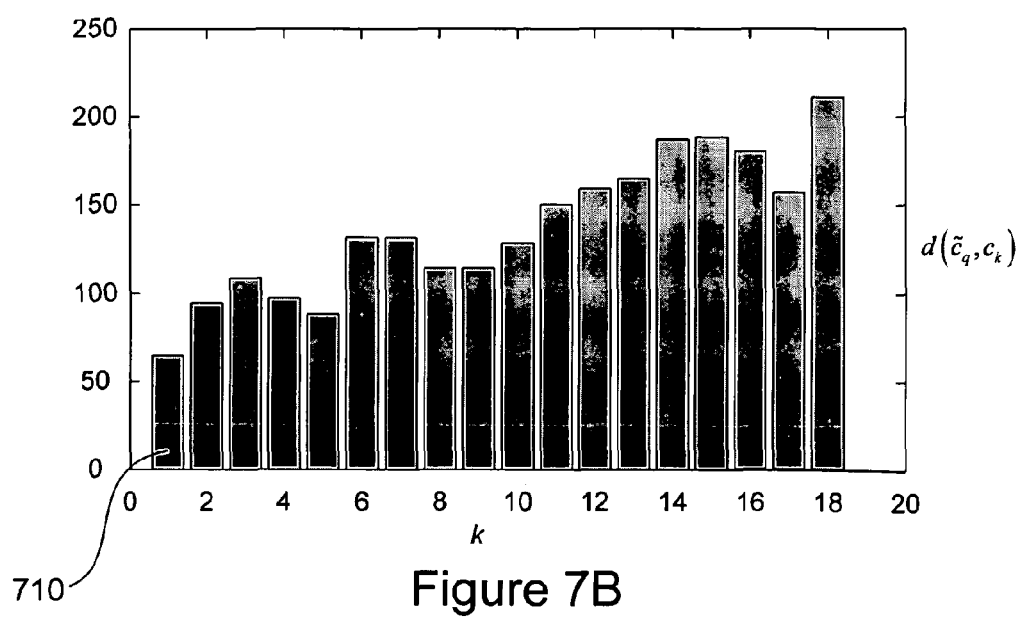

Armed with the primitive metrics, discussed above, erosion and dilation operations, and a tone mapped and registered set of output characters corresponding to the input characters, the rendered-character-quality metrics that represent embodiments of the present invention can be computed by methods of the present invention. A first metric, referred to as $\Delta PQ$, is computed as a relative entropy from character-to-character distributions. FIGS. 7A-B show two different distance distributions for a particular character $c_i$. The first distribution 702 is a distribution of computed differences between the input character $c_i$ and all input characters in a test pattern $c_k$. As can be seen in FIG. 7A, the input character $c_i$ is identical to itself, so that a first position in the histogram has a column of height "0" 704, and varies from other, dissimilar characters by a variety of different distances. For example, the most similar character to character $c_i$ is at a distance of "50" 706 and the most dissimilar character to character $c_i$ is at a distance of about "200" 708 from character $c_i$. FIG. 7B shows a distribution of the distances between rendered character $\hat{c}_i$ and all of the input characters $\hat{c}_k$. When the rendered character $\hat{c}_i$ is not rendered exactly according to the input character $c_i$, then the rendered character $\hat{c}_i$, is at a distance from the input character $c_i$, represented by the first column in the histogram 710. Note that the distributions of distances between the rendered character $\hat{c}_i$ and the remaining input characters $\hat{c}_k$ has changed with respect to the distribution of distances between the input character $c_i$ and input-character-set $c_k$. The $\Delta PQ$ metric, that represents one embodiment of the present invention, seeks to quantify the difference in distributions of each input character/output character pair with respect to the set of input characters. First, the probability that input character $c_i$ is the same character as input character $c_k$ can be computed as:

$$P_{ik} = Ae^{-distance(input_i, input_k)}$$

wherein distance($input_i$, $input_k$) is the distance between input character $c_i$ and input character $c_k$; and
A is a constant.

Similarly, the probability that output character $\hat{c}_i$ is equal to input character $c_k$ is computed as:

$$Q_{ik} = Be^{-distance(output_i, input_k)}$$

wherein distance($output_i$, $input_k$) is the distance between output character $\hat{c}_i$ and input character $c_k$; and
B is a constant.

A character-to-character-distance-distribution difference for the input character/output character pair $c_i/\tilde{c}_i$ can then be computed as a relative entropy:

$$\Delta PQ_i = \sum_{k=1}^{N} P_{ik}\left(\log_2\left(\frac{P_{ik}}{Q_{ik}}\right)\right)$$

Finally, a cumulative distance-distribution-based metric $\Delta PQ$ can be computed as the average of the $\Delta PQ_i$ metrics over the input character set, as follows:

$$\Delta PQ = \frac{\sum_{i=1}^{N} \Delta PQ_i}{N}$$

wherein N is the number of characters in the input-character set.

Figure 8A:
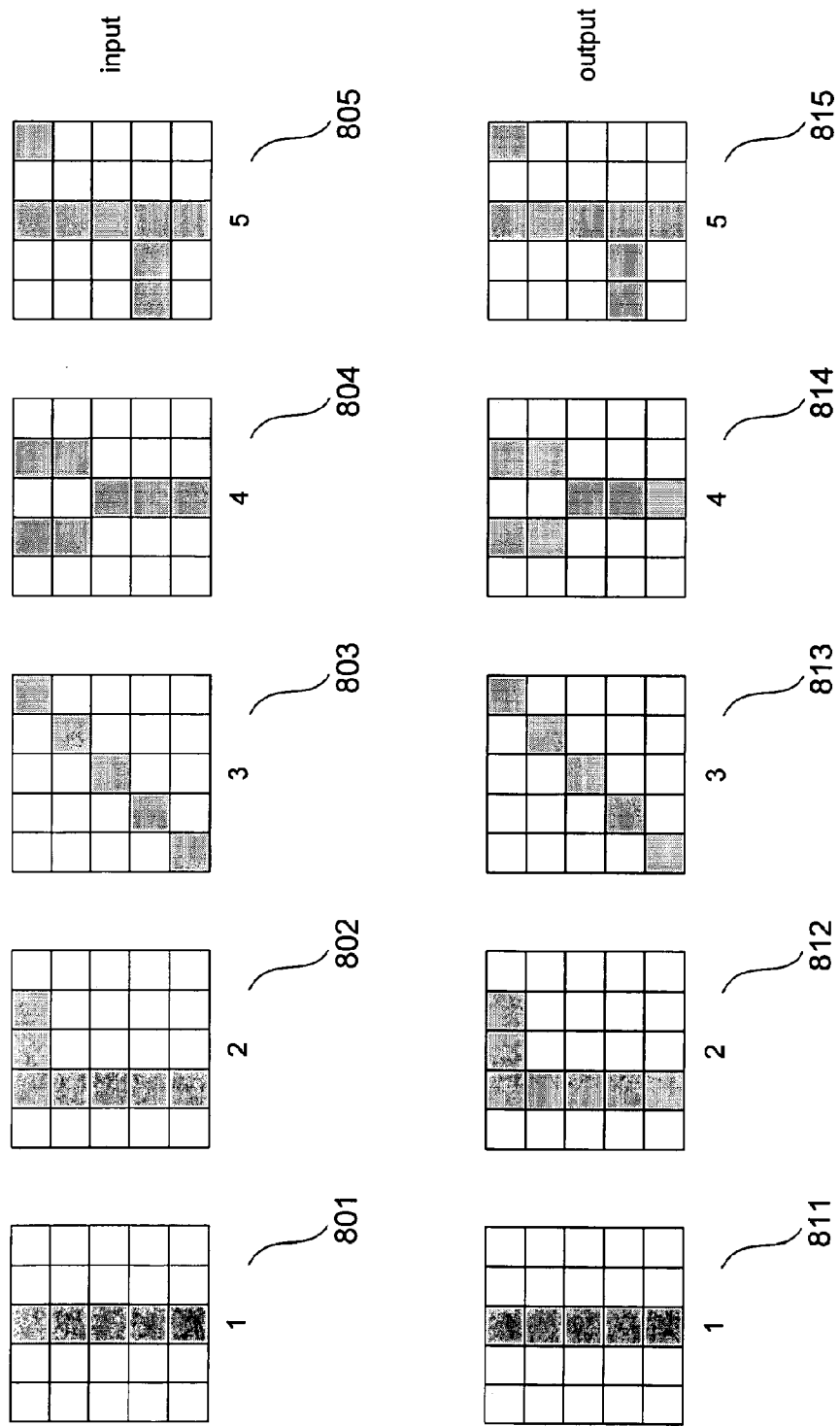

FIGS. 8A-C illustrate computation of the distance-distribution-based metric $\Delta PQ$ for a small, exemplary character set. FIG. 8A shows five simple input characters 801-805 and five corresponding output characters 811-815. In this case, the character-rendering device is 100% accurate, so that the output characters exactly match the input characters. Next, as shown in FIG. 8B, a table of distances between each input/output character pair and all of the remaining input characters is computed, using the distance metric:

$$d_{ik} = \frac{(IO^2 + OO^2)}{T}$$

The top figure in each cell is the distance between the input character with index equal to the row index of the cell and the input character with index equal to the column of the cell. The lower figure in each cell is the distance between the output character with index equal to the row index of the cell and the input character with index equal to the column index of the cell. Because the input characters and output characters are identical, the distance between each input character $c_i$ and another input character $c_k$ and between the output character $\hat{c}_i$, and the other input character $c_k$ are equal, in the table shown in FIG. 8B. FIG. 8C shows the probabilities $P_{ik}$ and $Q_{ik}$ computed for each character pair of the character set shown in FIG. 8A, using the conversion formulas, discussed above, for converting distances to probabilities. Finally, at the bottom of FIG. 8C, calculation of the distance-distribution-based metric $\Delta PQ$ is shown. Because the expression for $\Delta PQ_i$ includes the term $$\log_2\left(\frac{P_{ik}}{Q_{ik}}\right),$$

in any case where $P_{ik}$ is equal to $Q_{ik}$, the term $k^{th}$ of $\Delta PQ_i$ is "0," since $\log_2(1)$ is equal to "0." Because all of the $P_{ik}$ are equal to $Q_{ik}$ in the example shown in FIG. 8A, all the terms are "0," and the final $\Delta PQ$ metric has the value "0." Thus, when the output character is exactly equal to the input character set, $\Delta PQ$ has the value "0."

Figure 9A:
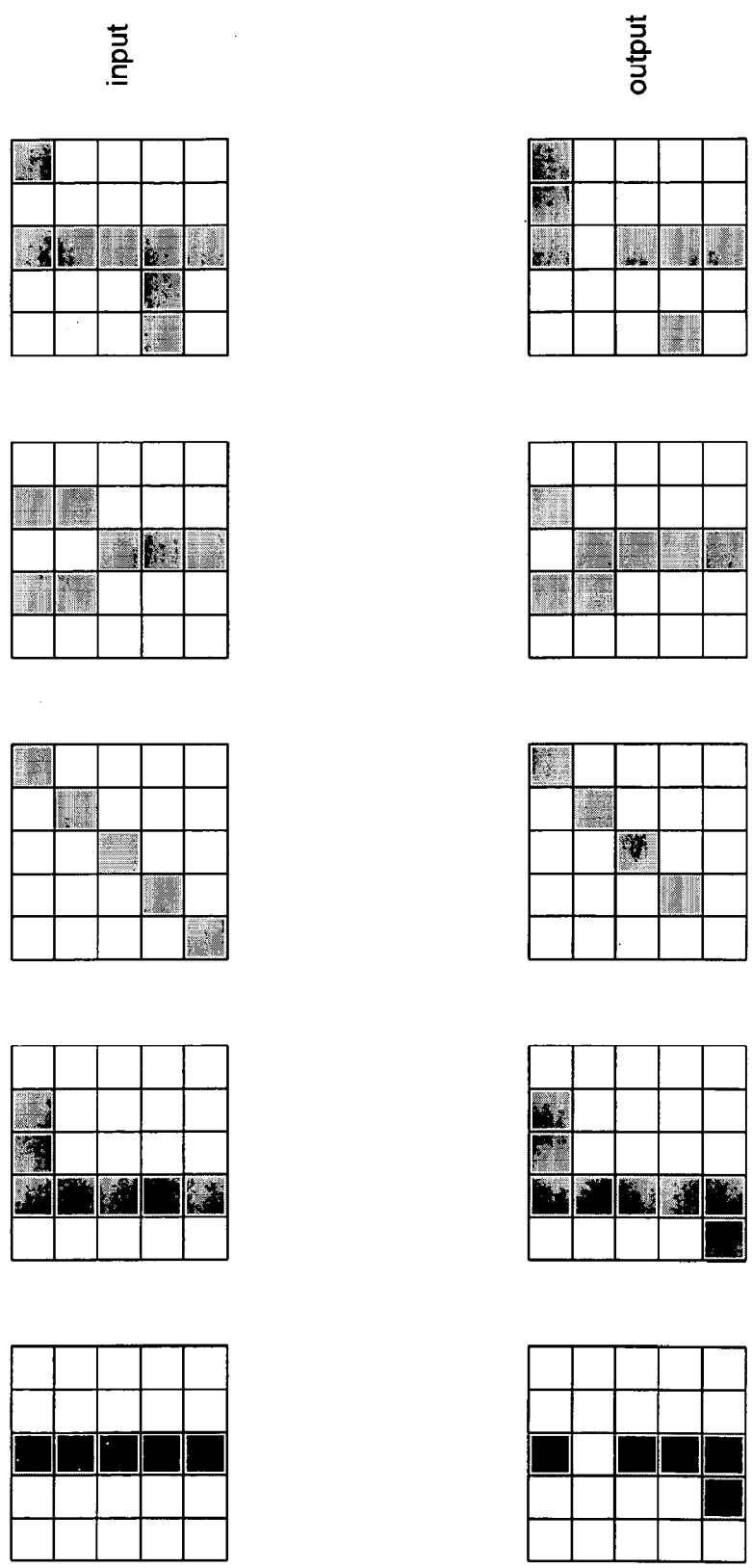

FIGS. 9A-C use identical illustration conventions as used in FIGS. 8A-C to show computation of the distance-distribution-based metric $\Delta PQ$ for a set of output characters that differ from a set of input characters. In this case, $\Delta PQ$ is computed to have the value of "0" 4364. Thus, as the differences between the input characters and output characters increase, the magnitude of the metric $\Delta PQ$ also generally increases. Thus, $\Delta PQ$ is a scaler value that takes into account the differences in pairs of distance distributions between each input-character/output-character pair and all of the input characters in the input-character set. The magnitude of $\Delta PQ$ is inversely proportional to character-rendering quality. Of course, the range of magnitudes of computed $\Delta PQ$ values depends on the constants chosen for the distance-to-probability conversions and the particular distance metrics employed.

Figure 10A:
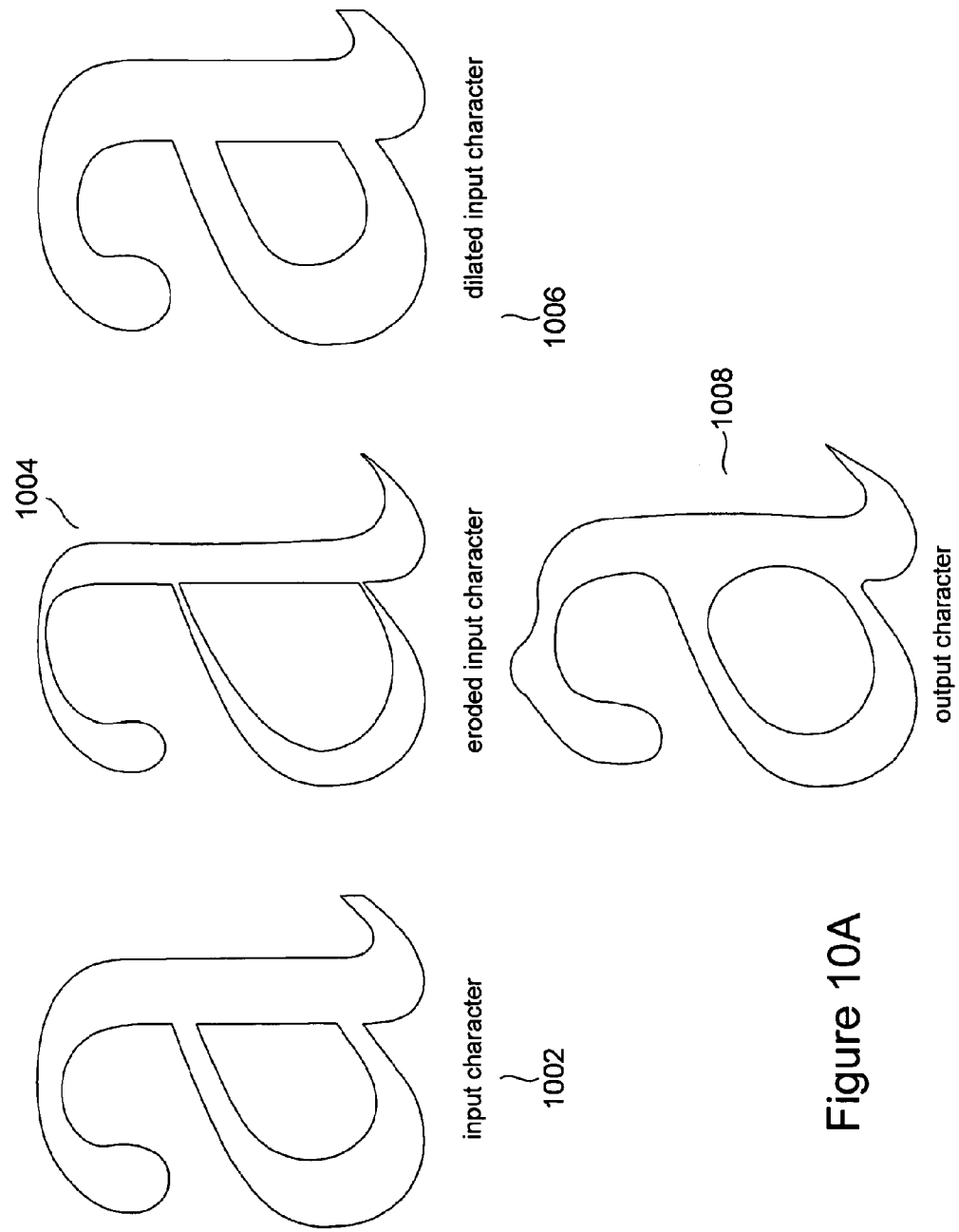
FIGS. 10A-B shows four versions of a particular character employed in outline metrics and superposition of a rendered character with a dilated-character outline and with an eroded-character outline.
Figure 10B:
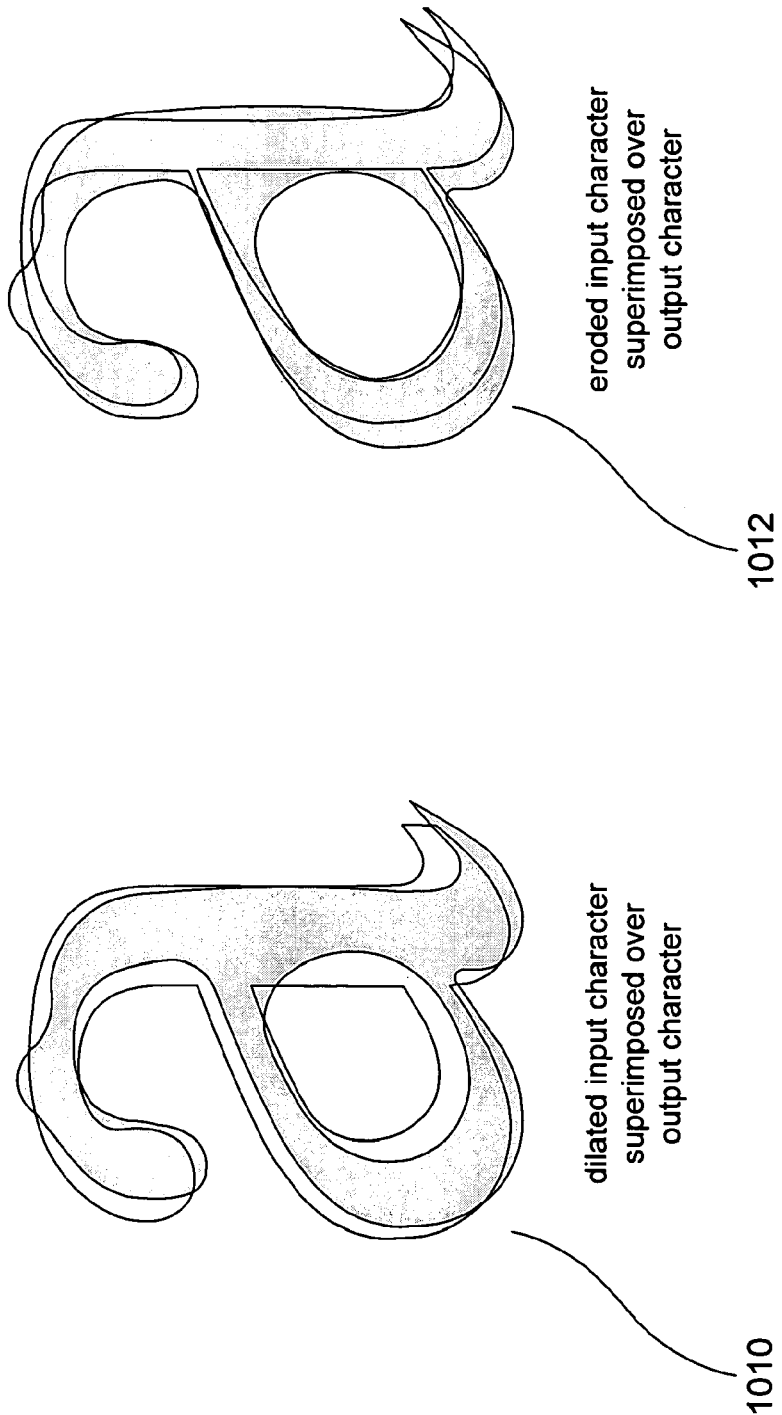

Additional useful metrics that represent embodiments of the present invention employ superpositions of eroded and dilated input characters and corresponding output characters, and are referred to as "outline metrics." FIGS. 10A-B shows four versions of a particular character employed in outline metrics and superposition of a rendered character with a dilated-character outline and with an eroded-character outline. FIG. 10A shows the four versions of a particular character employed in the outline metrics. FIG. 10A shows the outline of input character "a" shown in FIG. 3A 1002, the outline of input character "a" following erosion 1004, the outline of input character "a" following dilation 1006, and the outline of the output character "a" corresponding to the input character "a" 1008. As shown in FIG. 10B, the output character can be superimposed with the dilated input character 1010 and can be superimposed with the eroded input character 1012. These two superpositions form the basis of the additional outline metrics. The input character, dilated input character, eroded input character, and output character can each be viewed as sets of character-intensity pixels, allowing various subsets of the input and output characters can be obtained by familiar set operations, such as union, intersection, and set subtraction. In general, the union of two characters is the pixel locations of pixels in either one or both characters. These outline metrics are next discussed using the following notation for the particular input character, the dilated input character, the eroded input character, the output character, and three functions num, sum, and std on sets of pixels:

$c_i$=an input character of the input-character set with index i, considered as the set of pixels with character-intensity values within the pixel-based map of $c_i$ $\tilde{c}_i$=dilation $(c_i)$ $\bar{c}_i$=erosion $(c_i)$ $\hat{c}_i$=output character corresponding to $c_i$, considered as the set of pixels with character-intensity values within the pixel-based map of $c_i$ num(a)=the number of pixels in the set of character-intensity pixels that represent character "a"

sum(a)=the sum of the pixel-intensity values of the pixels in the set of character-intensity pixels that represent character "a"

std(a)=the standard deviation of the pixel-intensity values of the pixels in the set of character-intensity pixels that represent character "a"

Four metrics for the particular character index i of the character set have been found to particularly useful for character-rendering-quality assessment, although many additional outline metrics may find utility. A stroke irregularity metric can be computed for input character $c_i$ as:

$$\text{stroke\_irregularity}_i = \frac{num\ (\hat{c}_i - \tilde{c}_i)}{num\ (c_i)}$$

Stroke irregularity is a ratio of the number of character-intensity pixels of the output character outside the border of the dilated input character superimposed on the output character divided by the number of character-intensity pixels within the input character.

A contrast measure metric can be computed for input character $c_i$ as:

$$\text{contrast\_measure}_i = \frac{\text{sum}\ (\hat{c}_i in(\overline{c}_i \cap \hat{c}_i))}{num\ (\overline{c}_i \cap \hat{c}_i)} \div \frac{\text{sum}\ (\hat{c}_i in(\hat{c}_i - \tilde{c}_i))}{num\ (\hat{c}_i - \tilde{c}_i)}$$

Contrast measure is the mean value of pixels within the output character that are also within the boundary of the eroded input character superimposed over the output character divided by the mean value of the pixels of the output character outside the boundary of the dilated input character superimposed over the output character.

A sharpness metric can be computed for input character $c_i$ as:

$$\text{sharpness}_i = \frac{\text{sum}\ (\hat{c}_i in(\overline{c}_i \cap \hat{c}_i))}{num\ (\overline{c}_i \cap \hat{c}_i)} \div \frac{\text{sum}\ (\hat{c}_i in((\tilde{c}_i \cap \hat{c}_i) - \overline{c}_i))}{num\ ((\tilde{c}_i \cap \hat{c}_i) - \overline{c}_i)}$$

Sharpness is the mean value of pixels of the output character within the eroded-character boundary superimposed over the output character divided by the mean value of the pixels of the output character between the eroded-character boundary and dilated-input-character boundary, both superimposed over the output character.

Finally, a background-uniformity metric can be computed for input character $c_i$ as:

$$\text{background\_uniformity}_i = \text{std}(\hat{c}\ in\ (\hat{c}_i - \tilde{c}_i))$$

Background uniformity is the standard deviation of the pixel values of the output character outside of the dilated-input-character boundary superimposed over the output character.

For each of the four above-described metrics, a cumulative metric can be computed for the metrics computed for each of N character of the character set by:

$$\text{metric} = \frac{\sum_{i=1}^{N} \text{metric}_i}{N}$$

Additionally, the individual outline metrics can be combined to produce a composite outline metric.

A large variety of different composite metrics may be computed from the above-described metrics and the cumulative metric $\Delta PQ$. In certain embodiments of the present invention, various cumulative metrics are computed. In other embodiments of the present invention, the individual metrics $\Delta PQ_i$, stroke_irregularity$_i$, contrast_measure$_i$, sharpness$_i$, and background_uniformity$_i$ metrics are stored and output to a user. In all cases, these metrics may be used to assign an overall quality to rendered text characters and other graphics analyzed by method embodiments of the present invention. Methods of the present invention may be incorporated into any of a number of different types of systems, including rendered-character-quality-measuring systems and in printing devices and other character-rendering devices with self-monitoring subsystems.

Figure 11:
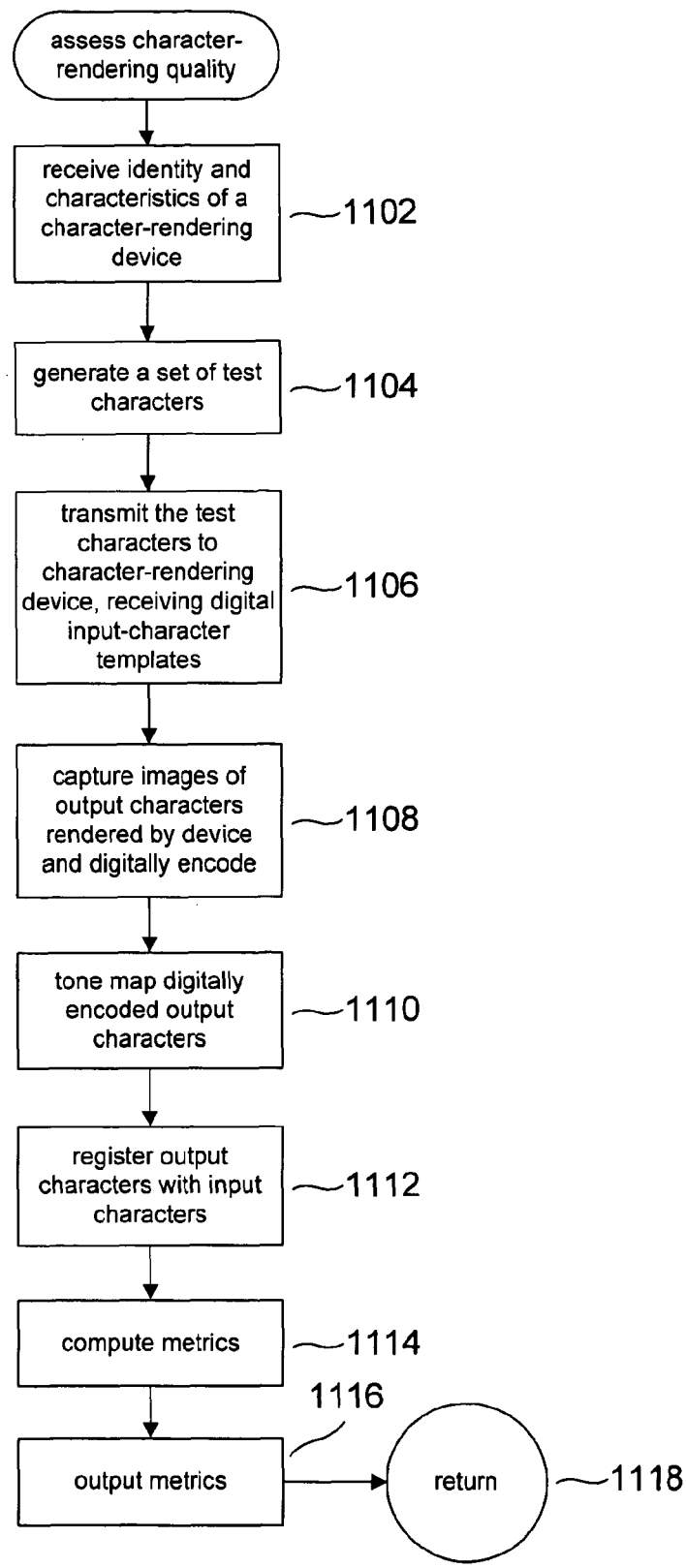
FIG. 11 is a control-flow diagram that illustrates one method embodiment of the present invention.

FIG. 11 is a control-flow diagram that illustrates one method embodiment of the present invention. In step 1102, the identity and characteristics of the character-rendering to be tested are received. In step 1104, a suitable set of test characters is devised. Then, in step 1106, the test characters are transmitted to the identified character-rendering device for rendering, with the input character maps used by the character-rendering device intercepted as input characters. Then, in step 1108, images of the characters rendered by the character-rendering device are captured and digitally encoded in order to generate a set of output characters. In step 1110, the output characters are tone mapped and are then, in step 1112, registered with the input characters. Various input-character/output-character difference metrics are computed, in step 1114, as discussed above. These metrics may include one or more of $\Delta PQ_i$s and $\Delta PQ$, stroke irregularity, contrast measure, sharpness, background uniformity, and various cumulative and collective metrics based on these. Finally, the computed metrics are output to a user or device, in step 1116.

Although the present invention has been described in terms of particular embodiments, it is not intended that the invention be limited to these embodiments. Modifications within the spirit of the invention will be apparent to those skilled in the art. For example, method embodiments of the present invention may be implemented in many different ways, depending on selection of various computational parameters, including modular organization, control structures, data structures, programming languages, and program-execution environments, including operating-system platforms. Method embodiments of the present invention can be used to evaluate the quality of text and graphics printed by any of the many different kinds of printing devices. In addition, method embodiments of the present invention can be used to evaluate the quality of text rendered for display, printing, communication to remote devices, and otherwise rendered for use and perception by humans and by automated systems. While, in the disclosed embodiment, printed text is scanned to generate digitally encoded output characters, any number of different image-capture methods and devices can be used to obtain digitally-encoded output characters, including photography using film or digital cameras, intercepting electronic signals, and by other such methods and devices. As discussed above, many variations of the methods of the present invention are possible, including alternative computation of different types of distances, distance-based probabilities, distance-distribution-difference based metrics, and other metrics. The method embodiments of the present invention may be incorporated into any number of different types of printing devices and printing-quality-measuring devices and systems.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

The invention claimed is:

1. A method that assesses character-rendering quality, the method comprising:
    transmitting a test-character set of test characters to a character-rendering device for rendering;
    intercepting digital pixel-based character maps for the test characters of the test-character set, used by the character-rendering device for rendering the test characters, to serve as an input-character set of input characters;
    capturing, with a computing system, the test characters rendered by the character-rendering device to serve as an output-character set of output characters;
    for each input character, generating with the computing system, from the intercepted input characters, one or more first metrics that reflect differences between the input character and at least two of the input characters;
    for each output character, generating with the computing system, from the intercepted input characters and the captured output characters, one or more second metrics that reflect differences between the output character and at least two of the input characters; and
    outputting one or more indications of character-rendering quality based on the first and second metrics.

2. The method of claim 1 further including:
    initially receiving an identity and characteristics of the character-rendering device; and
    devising a test-character set appropriate for testing the character-rendering device.

3. A method that assesses character-rendering quality, the method comprising:
    transmitting a test-character set of test characters to a character-rendering device for rendering;
    intercepting digital pixel-based character maps for the test characters of the test-character set, used by the character-rendering device for rendering the test characters, to serve as an input-character set of input characters;
    capturing, with a computing system, the test characters rendered by the character-rendering device to serve as an output-character set of output characters;
    for each input character $c_i$, generating with the computing system, from the intercepted input characters and the captured output characters, one or more metrics that reflect differences between the input characters and the output characters; and
    outputting one or more indications of character-rendering quality based on the one or more metrics, wherein capturing test characters rendered by the character-rendering device to serve as an output-character set of output characters further includes:
    capturing images of test characters rendered by the character-rendering device by an image-capturing device;
    generating digitally-encoded, pixel-based representations of the test characters rendered by the character-rendering device from the captured images;
    tone mapping the digitally-encoded representations of the rendered test characters; and
    registering the digitally-encoded representations of the rendered test characters with the input characters in order to generate a set of digitally encoded output characters corresponding to the input characters to serve as the output-character set of output characters.

4. The method of claim 1 wherein test characters include:
    graphical symbols;
    English-language text characters;
    punctuation symbols;
    foreign-language text characters; and
    pixel patterns.

5. The method of claim 1 wherein the one or more first metrics include one or more differences $\Delta PQ_i$ in character-to-character distance distributions between the distance distribution of the distances between a particular input character $c_i$ and all input characters $c_k$ in the input-character set, and wherein the one or more second metrics include one or more differences $\Delta PQ_i$ in character-to-character distance distributions between the distance distribution of the distances between a particular output character $\hat{c}_i$ corresponding to input character $c_i$ and all input characters $c_k$ in the input-character set.

6. The method of claim 5 wherein the one or more metrics further includes a cumulative $\Delta PQ$ metric from the generated $\Delta PQ_i$ metrics.

7. The method of claim 5 wherein each $\Delta PQ_i$ is generated according to:

$$P_{ik} = Ae^{-distance(input_i, input_k)}$$

$$Q_{ik} = Be^{-distance(output_i, input_k)}$$

$$\Delta PQ_i = \sum_{k=1}^{N} P_{ik}\left(\log_2\left(\frac{P_{ik}}{Q_{ik}}\right)\right)$$

wherein distance($input_i$, $input_k$) is the distance between input character $c_i$ and input character $c_k$;
    distance ($output_i$, $input_k$) is the distance between output character $\hat{c}_i$ and input character $c_k$; and
    A and B are constants.

8. The method of claim 7 wherein the cumulative $\Delta PQ$ metric is generated according to:

$$\Delta PQ = \frac{\sum_{i=1}^{N} \Delta PQ_i}{N}$$

wherein N is the number of characters in the input-character set.

9. A method that assesses character-rendering quality, the method comprising:
    transmitting a test-character set of test characters to a character-rendering device for rendering;
    intercepting digital pixel-based character maps for the test characters of the test-character set, used by the character-rendering device for rendering the test characters, to serve as an input-character set of input characters;
    capturing, with a computing system, the test characters rendered by the character-rendering device to serve as an output-character set of output characters;
    for each input character $c_i$, generating with the computing system, from the intercepted input characters and the captured output characters, metrics that reflect differences between the input characters and the output characters, including a cumulative metric metric for each set of metrics $metric_i$ which is generated as $$\text{metric} = \frac{\sum_{i=1}^{N} \text{metric}_i}{N}$$

wherein N is the number of input characters in the input-character set; and outputting one or more indications of character-rendering quality based on the metrics.

10. A method that assesses character-rendering quality, the method comprising:

transmitting a test-character set of test characters to a character-rendering device for rendering;

intercepting digital pixel-based character maps for the test characters of the test-character set, used by the character-rendering device for rendering the test characters, to serve as an input-character set of input characters;

capturing, with a computing system, the test characters rendered by the character-rendering device to serve as an output-character set of output characters;

for each input character $c_i$, generating with the computing system, from at least one of eroded or dilated transformations of the intercepted input characters superimposed over the captured output characters, one or more outline metrics that reflect differences between the input characters and the output characters; and outputting one or more indications of character-rendering quality based on the one or more metrics.

11. The method of claim 10 wherein the one or more metrics include further includes a contrast measure metric contrast_measure$_i$ for each input character $c_i$ and corresponding output character $\hat{c}_i$ as:

$$\text{contrast\_measure}_i = \frac{\text{sum } (\hat{c}_i in(\overline{c}_i \cap \hat{c}_i))}{\text{num } (\overline{c}_i \cap \hat{c}_i)} \div \frac{\text{sum } (\hat{c}_i in(\hat{c}_i - \tilde{c}_i))}{\text{num } (\hat{c}_i - \tilde{c}_i)}$$

wherein contrast measure is a mean value of pixels within the output character $\hat{c}_i$ that are also within a boundary of eroded input character $\overline{c}_i$ superimposed over output character $\hat{c}_i$ divided by a mean value of the pixels of output character $\hat{c}_i$ outside a boundary of dilated input character $\tilde{c}_i$ superimposed over output character $\hat{c}_i$.

12. The method of claim 10 wherein the one or more metrics include further includes a sharpness metric sharpness$_i$ for each input character $c_i$ and corresponding output character $\hat{c}_i$ as:

$$\text{sharpness}_i = \frac{\text{sum } (\hat{c}_i in(\overline{c}_i \cap \hat{c}_i))}{\text{num } (\overline{c}_i \cap \hat{c}_i)} \div \frac{\text{sum } (\hat{c}_i in((\tilde{c}_i \cap \hat{c}_i) - \overline{c}_i))}{\text{num } ((\tilde{c}_i \cap \hat{c}_i) - \overline{c}_i)}$$

wherein sharpness is a mean value of pixels of the output character $\hat{c}_i$ within eroded-character $\overline{c}$ boundary superimposed over output character $\hat{c}_i$ divided by a mean value of the pixels of output character $\hat{c}_i$ between an eroded-character $\overline{c}$ boundary and a dilated-input-character $\tilde{c}_i$ boundary, both superimposed over output character $\hat{c}_i$.

13. The method of claim 10 wherein the one or more metrics include further includes a background uniformity metric background_uniformity$_i$ for each input character $c_i$ and corresponding output character $\hat{c}_i$ as:

$$\text{background\_uniformity}_i = \text{std}(\hat{c} \text{ in } (\hat{c}_i - \tilde{c}_i))$$

wherein background uniformity is a standard deviation of the pixel values of the output character $\hat{c}$ outside of the dilated-input-character $\hat{c}_i$ boundary superimposed over the output character.

14. The method of claim 10 wherein the one or more metrics include further includes a stroke irregularity metric stroke_irregularity$_i$ for each input character $c_i$ and corresponding output character $\hat{c}_i$ as:

$$\text{stroke\_irregularity} = \frac{\text{num } (\hat{c}_i - \tilde{c}_i)}{\text{num } (c_i)}$$

wherein stroke irregularity is a ratio of the number of character-intensity pixels of output character $\hat{c}_i$ outside a border of dilated input character $\tilde{c}_i$ superimposed on output character $\hat{c}_i$ divided by a number of character-intensity pixels within input character $c_i$.

* * * * *

UNITED STATES PATENT AND TRADEMARK OFFICE
CERTIFICATE OF CORRECTION

| | |
|---|---|
| PATENT NO. | : 8,594,384 B2 |
| APPLICATION NO. | : 12/744912 |
| DATED | : November 26, 2013 |
| INVENTOR(S) | : Ayelet Pnueli |

It is certified that error appears in the above-identified patent and that said Letters Patent is hereby corrected as shown below:

IN THE CLAIMS:

Column 12, Line 66, delete "metric metric" and insert --metric--.

Column 14, Line 27, delete "$\hat{c}_i$;" and insert --$\tilde{c}_i$--.

Signed and Sealed this
Twenty-fifth Day of March, 2014

Michelle K. Lee
*Deputy Director of the United States Patent and Trademark Office*